United States Patent
Gupta et al.

(10) Patent No.: US 10,873,785 B2
(45) Date of Patent: Dec. 22, 2020

(54) CONTENT RECOMMENDATION SYSTEM AND METHOD-BASED IMPLICIT RATINGS

(71) Applicant: Alphonso Inc., Mountain View, CA (US)

(72) Inventors: Manish Gupta, Bangalore (IN); Lampros Kalampoukas, Brick, NJ (US); Zhengziang Pan, Edison, NJ (US); Naren Sirugudi, Bangalore (IN)

(73) Assignee: Alphonso Inc., Mountain View, CA (US)

( * ) Notice: Subject to any disclaimer, the term of this patent is extended or adjusted under 35 U.S.C. 154(b) by 0 days.

(21) Appl. No.: 16/241,965

(22) Filed: Jan. 7, 2019

(65) Prior Publication Data

US 2020/0221181 A1    Jul. 9, 2020

(51) Int. Cl.
| | |
|---|---|
| *H04N 7/16* | (2011.01) |
| *H04N 21/466* | (2011.01) |
| *H04N 21/45* | (2011.01) |
| *G06F 16/78* | (2019.01) |
| *G06F 16/28* | (2019.01) |
| *H04N 21/84* | (2011.01) |

(52) U.S. Cl.
CPC ....... *H04N 21/4668* (2013.01); *G06F 16/285* (2019.01); *G06F 16/7867* (2019.01); *H04N 21/4524* (2013.01); *H04N 21/4532* (2013.01); *H04N 21/84* (2013.01)

(58) Field of Classification Search
CPC ........... H04N 21/4668; H04N 21/4524; H04N 21/4532; H04N 21/84
USPC ...................................................... 725/139
See application file for complete search history.

(56) References Cited

U.S. PATENT DOCUMENTS

| | | | | |
|---|---|---|---|---|
| 8,316,411 | B2 * | 11/2012 | Weintraub | H04N 7/17318 725/134 |
| 9,055,333 | B2 * | 6/2015 | Whitten | H04N 21/4335 |
| 9,094,720 | B2 * | 7/2015 | Malik | H04N 5/44543 |
| 9,736,503 | B1 | 8/2017 | Bakshi et al. | |
| 9,967,625 | B2 * | 5/2018 | Korst | H04N 21/4668 |
| 2002/0046084 | A1 | 4/2002 | Steele et al. | |
| 2002/0059313 | A1 * | 5/2002 | Yoon | H04H 60/33 |

(Continued)

OTHER PUBLICATIONS

Recommender system. Retrieved Feb. 27, 2018, from https://en.wikipedia.org/wiki/Recommender_system.

*Primary Examiner* — Michael B. Pierorazio
(74) *Attorney, Agent, or Firm* — Ungerman IP PLLC; Mark E. Ungerman

(57) ABSTRACT

A content recommendation system that recommends content based on previous user content information and information regarding the user and user device. The system is capable of accurately recommending content using collaborative filtering by comparing the user's profile to other user profiles. User profiles rely on implicit ratings to determine user preferences. Implicit ratings may be determined by collecting the content that a user consumed, in addition to user and user device information. The system recommends content that similar users have consumed. The system is also able to identify and recommend trending content by analyzing changes in metrics over time. The system may also rely on automatic content recognition to identify content that the user is consuming without requiring active user input.

4 Claims, 9 Drawing Sheets

(56) References Cited

U.S. PATENT DOCUMENTS

| | | | |
|---|---|---|---|
| 2002/0059584 A1* | 5/2002 | Ferman | G11B 27/105 725/34 |
| 2002/0174430 A1* | 11/2002 | Ellis | G11B 27/34 725/46 |
| 2004/0117829 A1* | 6/2004 | Karaoguz | H04L 29/06027 725/46 |
| 2006/0031889 A1* | 2/2006 | Bennett | H04L 29/06027 725/80 |
| 2006/0083434 A1* | 4/2006 | Inata | H04N 21/23113 382/232 |
| 2007/0124756 A1* | 5/2007 | Covell | G06Q 30/02 725/18 |
| 2007/0157247 A1* | 7/2007 | Cordray | G06F 3/0481 725/47 |
| 2007/0157260 A1* | 7/2007 | Walker | H04N 7/163 725/86 |
| 2007/0157281 A1* | 7/2007 | Ellis | H04N 7/17309 725/134 |
| 2008/0155059 A1* | 6/2008 | Hardin | H04N 7/17336 709/218 |
| 2008/0235733 A1* | 9/2008 | Heie | H04N 7/163 725/46 |
| 2009/0201988 A1* | 8/2009 | Gazier | H04N 21/222 375/240.06 |
| 2010/0086277 A1* | 4/2010 | Craner | H04N 5/76 386/278 |
| 2010/0231754 A1* | 9/2010 | Wang | H04N 5/76 348/231.99 |
| 2011/0078717 A1* | 3/2011 | Drummond | H04N 21/4586 725/14 |
| 2011/0307929 A1* | 12/2011 | Youssefmir | H04N 21/23106 725/89 |
| 2012/0117339 A1* | 5/2012 | Kandekar | H04L 67/10 711/159 |
| 2012/0210382 A1* | 8/2012 | Walker | G06F 16/1748 725/115 |
| 2013/0014187 A1* | 1/2013 | Huang | H04N 7/183 725/93 |
| 2013/0142499 A1* | 6/2013 | Major | H04N 7/17318 386/341 |
| 2013/0174202 A1* | 7/2013 | Kim | H04N 21/2662 725/61 |
| 2014/0013342 A1* | 1/2014 | Swan | H04N 21/2343 725/5 |
| 2014/0025837 A1* | 1/2014 | Swenson | H04N 21/222 709/231 |
| 2014/0067898 A1* | 3/2014 | Steiner | H04N 21/222 709/201 |
| 2014/0109124 A1 | 4/2014 | Morales et al. | |
| 2014/0136342 A1 | 5/2014 | Ringdahl | |
| 2014/0165116 A1* | 6/2014 | Major | G06F 21/6218 725/89 |
| 2014/0237525 A1* | 8/2014 | Rothschild | H04N 21/236 725/92 |
| 2014/0282761 A1* | 9/2014 | Bjordammen | H04N 21/231 725/92 |
| 2014/0316900 A1 | 10/2014 | Amla et al. | |
| 2014/0324603 A1 | 10/2014 | Savkar et al. | |
| 2015/0120468 A1 | 4/2015 | Knapp et al. | |
| 2015/0334430 A1* | 11/2015 | Clapp | H04N 21/6143 725/92 |
| 2015/0350701 A1* | 12/2015 | Lemus | H04N 21/23116 725/92 |
| 2016/0364767 A1 | 12/2016 | Maugans, III | |
| 2017/0357998 A1 | 12/2017 | Scharf | |

* cited by examiner

CONTENT RECOMMENDATION SYSTEM AND METHOD-BASED IMPLICIT RATINGS

This patent application contains subject matter related to U.S. patent application Ser. Nos. 16/241,966; 16/241,969; 16/241,971; 16/241,973; 16/241,974; 16/241,975; and 16/241,979 all of which were filed on even date herewith and the disclosure of all of which are hereby incorporated by reference.

BACKGROUND OF THE INVENTION

1. Field of the Invention

The present invention relates to a content recommendation system, and particularly to a community-based intelligent content recommendation system.

2. Description of the Related Technology

A recommender system or a recommendation system is a subclass of information filtering system that seeks to predict the "rating" or "preference" a user would give to an item.

Recommender systems have been utilized in a variety of areas including movies, music, news, books, research articles, search queries, social tags, and products in general. There are also recommender systems for experts, collaborators, jokes, restaurants, garments, financial services, life insurance, romantic partners (online dating), and Twitter pages.

Recommender systems typically produce a list of recommendations in one of two ways—through collaborative filtering or through content-based filtering (also known as the personality-based approach). Collaborative filtering approaches build a model from a user's past behavior (items previously purchased or selected and/or numerical ratings given to those items) as well as similar decisions made by other users. This model is then used to predict items (or ratings for items) that the user may have an interest in. Content-based filtering approaches utilize a series of discrete characteristics of an item in order to recommend additional items with similar properties. These approaches are often combined.

Recommender systems may serve as an alternative to search algorithms since they help users discover items they might not have found otherwise.

Recommender systems are show in U.S. Pat. Nos. 7,222,085; 7,483,871; 8,056,100; 8,468,046; and 9,070,156.

Collaborative filtering methods are based on collecting and analyzing a large amount of information on users' behaviors, activities or preferences and predicting what users will like based on their similarity to other users. Collaborative filtering does not rely on machine analyzable content and therefore it is capable of accurately recommending complex items such as movies without requiring an "understanding" of the item itself.

Collaborative filtering assumes that people who agreed in the past will agree in the future, and that they will like similar kinds of items as they liked in the past.

When building a model from a user's behavior, a distinction is often made between explicit and implicit forms of data collection.

Examples of explicit data collection include the following:
  Asking a user to rate an item on a sliding scale.
  Asking a user to search.
  Asking a user to rank a collection of items from favorite to least favorite.
  Presenting two items to a user and asking him/her to choose the better one of them.
  Asking a user to create a list of items that he/she likes.

Examples of implicit data collection include the following:
  Observing the items that a user views in an online store.
  Analyzing item/user viewing times.
  Keeping a record of the items that a user purchases online.
  Obtaining a list of items that a user has listened to or watched on his/her computer.
  Analyzing the user's social network and discovering similar likes and dislikes.

The recommender system may compare the collected data to similar and dissimilar data collected from others and calculates a list of recommended items for the user.

Collaborative filtering approaches may suffer from three problems: cold start, scalability, and sparsity.

Cold start: These systems often require a large amount of existing data on a user to make accurate recommendations.

Scalability: In many of the environments in which these systems make recommendations, there are millions of users and products. Thus, a large amount of computation power is often necessary to calculate recommendations.

Sparsity: The number of items sold on major e-commerce sites is extremely large. The most active users will only have rated a small subset of the overall database. Thus, even the most popular items have very few ratings.

A collaborative filtering algorithm uses matrix factorization, a low-rank matrix approximation technique.

Collaborative filtering methods are classified as memory-based and model based collaborative filtering. A well-known example of memory-based approaches is user-based algorithm and that of model-based approaches is Kernel-Mapping Recommender.

Content-based filtering methods are based on a description of the item and a profile of the user's preferences. In a content-based recommender system, keywords are used to describe the items and a user profile is built to indicate the type of item this user likes. In other words, these algorithms try to recommend items that are like those that a user liked in the past (or is examining in the present). Various candidate items are compared with items previously rated by the user and the best-matching items are recommended. This approach has its roots in information retrieval and information filtering research.

To abstract the features of the items in the system, an item presentation algorithm is applied. A widely used algorithm is the tf-idf representation (also called vector space representation).

To create a user profile, the system mostly focuses on two types of information:
  1. A model of the user's preference.
  2. A history of the user's interaction with the recommender system.

Basically, these methods use an item profile (i.e., a set of discreet attributes and features) characterizing the item within the system. The system creates a content-based profile of users based on a weighted vector of item features. The weights denote the importance of each feature to the user and can be computed from individually rated content vectors using a variety of techniques. Simple approaches use the average values of the rated item vector while other sophisticated methods use machine learning techniques such as Bayesian Classifiers, cluster analysis, decision trees, and artificial neural networks in order to estimate the probability that the user is going to like the item.

Direct feedback from a user, usually in the form of a like or dislike button, can be used to assign higher or lower weights on the importance of certain attributes (using Rocchio classification or other similar techniques).

A key issue with content-based filtering is whether the system is able to learn user preferences from users' actions regarding one content source and use them across other content types. When the system is limited to recommending content of the same type as the user is already using, the value from the recommendation system is significantly less than when other content types from other services can be recommended. For example, recommending news articles based on browsing of news is useful, but would be much more useful when music, videos, products, discussions etc. from different services can be recommended based on news browsing.

G. Adomavicius and A. Tuzhilin, *IEEE Trans. on Data and Knowledge Engineering* 17:6, pp. 734-749, 2005 entitled, "Towards the next generation of recommender systems: a survey of the state-of-the-art and possible extensions," shows recommender systems and is expressly incorporated by reference herein and presents information on targeting and recommendation systems [and shows methods to implement both memory-based and model-based collaborative filtering methods].

U.S. Pat. No. 8,001,008 B2 entitled, "System and Method of Collaborative Filtering Based on Attribute Profiling," is expressly incorporated by reference herein and shows a method for generating a product profile of a content-based product through applying value data assigned by a user to a set of attributes embodying possible reasons as to why the user reacts to the content-based product, generating a user profile of a user through applying a group of value data assigned by the user to a content-based product sharing the set of attributes and recommending a different content-based product matches with the user profile beyond a threshold value.

U.S. Patent Publication No. 2006/0161952 A1 entitled, "System and method for providing access to data using customer profiles," is expressly incorporated by reference herein and shows a system and method for scheduling the receipt of desired movies and other forms of data from a network which simultaneously distributes many sources of such data to many customers, as in a cable television system. Customer profiles are developed for the recipient describing how important certain characteristics of the broadcast video program, movie or other data are to each customer. From these profiles, an "agreement matrix" is calculated by comparing the recipient's profiles to the actual profiles of the characteristics of the available video programs, movies, or other data.

U.S. Patent Publication No. 2011/0289114 A1 entitled "System and method for auto content recognition," is expressly incorporated by reference herein and shows automatically recognizing media contents by the steps of capturing media content from the Internet and/or devices, extracting fingerprints from captured content and transferring to backend servers for identification, and backend servers processing the fingerprints and replying with identified result.

U.S. Patent Publication No. 2015/0331660 A1 entitled, "Efficient Apparatus and Method for Audio Signature Generation Using Audio Threshold," is expressly incorporated by reference herein and shows an automatic content recognition system that includes a user device for capturing audio and generating an audio signature.

SUMMARY OF THE INVENTION

User content consumption exposure information may be used in connection with recommendation systems and targeting systems directed at a user. An object is to utilize advanced techniques to recommend content or target a user. The system may include user profiles which [provide] information describing or identifying content exposure of a user. The user profile may contain user content information identifying content consumed by a user such as audio and/or visual exposure to identifiable content and metadata describing parameters of such exposure. For example, the metadata may include metrics relating to exposure conditions such as length of time a user consumed the content and the frequency in which the user consumed the content. The user profile may also contain metadata such as user device identification, location information, and other information related to a user/content consumer. User information may include demographic and other information. A user profile may also contain information regarding interpreted human-machine interactions associated with the user, such as user interest in content.

Content may refer audio and visual content, visual only content, or audio only content. Embodiments may be described in terms of one form of content, but the system is equally applicable to other forms of content. "Similar content" is any content that the recommendation system identifies to have similarity to user content based one or more metrics. "Recommendation scores" refer to a rating of the similarity between a user profile and content based on one or more metrics. "Content of interest" is any content that the recommendation system determines would be of interest to the user based on one or more metrics.

A recommendation system is a type of targeting system based, at least in part, on knowledge about the habits and behavior of a consumer. There are many ways to accumulate information about the past and current behavior or exposure of a person.

Taking media exposure as an example, exposure information can be acquired directly from devices involved in the delivery of media or from devices that "sense" content or exposure to content. The identification of the consumer may be derived by the assumption that the user is consuming content delivered to a device associated with the user in some way, or a location associated with the user. Advantageously, automatic content recognition (ACR) may be utilized to gather exposure information. Devices involved in the delivery of content, such as web browsers, televisions and set-top boxes may collect and/or transmit identification of delivered content. User devices include smartphones, tablets, Smart TVs, personal computers or other devices.

Trending content may refer to content that is identified by a change in one or more metrics of an aggregated set of users, for example when viewership of content increases by some measure, a determined amount over a specified time period. Trending users may refer to users who consumed the trending content.

An apparatus for recommending content may include a receiver connected to one or more communication channels configured or programmed to receive TV content information. A user profile generator may be connected to the receiver and a recommendation engine and may be configured to convert information from the receiver into a user profile that indicated user preferences. The apparatus may include a profile database that stores one or more user profiles. Other information, such as user information and user device information may also be stored in the profile database. The system may include a processor that is connected to the profile database. The processor may also be responsive to the recommendation engine. The recommendation engine may request that the processor retrieve profiles from the profile database. The processor may use collaborative filtering to find profiles that are similar to the user profile. The recommendation engine may then assign recommendation scores to content in the similar user profiles based on one or more metrics. The recommendation engine may then recommend content based the recommendation score and whether the user has already consumed the content, in addition to other factors depending on the specific embodiment.

A method for recommending content may include the steps of: receiving user content information, generating a user profile by using the user content information as implicit ratings of content, retrieving similar user profiles, and recommending content by comparing the user profile to one or more similar user profiles.

The system may also recommend trending content. Trending content may be measured by a change in one or more metric measuring aggregated data. Content may be trending over the entire set of user profiles in the profile database or may be trending within a subset of the user profiles. In one embodiment, trending content may be sent to all users. In another embodiment, the processor may aggregate the trending users into a trending profile. The system may then be configured to find users with user profiles that are similar to the trending profile. The recommendation engine may then recommend the trending content to similar users who have not consumed the trending content.

Automatic content recognition is particularly advantageous to recommender systems because user content exposure information from any source may be gathered without user input. It is advantageous, but not required, for the information concerning the exposure and user is collected by a remote user device such as a smartphone or tablet. A recommender system that is dedicated to one or a limited set of content output devices such as a TV or audio player will only be able to base recommendations on content consumed through the associated output devices. Using a personal digital device such as a smartphone or a tablet to acquire information regarding exposure has the advantage of collecting data across output devices. This is achieved because the personal digital device tends to remain with a user and therefore there is a high correlation between user exposure to content and personal digital device exposure to content.

A Content Signature is a digital summary of content such as audio or visual content. The signature may be generated from content sensed by a microphone, camera or other sensor. For ease of understanding, a described embodiment of content signature is an audio signature, however the system is intended to encompass operations using audio, visual or other media.

An Audio Signature is a digital summary, generated from an audio signal, which can be used to identify an audio sample or quickly locate similar items in a database.

An Audio Fingerprint is a condensed digital summary, generated from an audio signal, which can be used to identify an audio sample or quickly locate similar items in an audio database. As used herein, a fingerprint is a special form of a signature.

Automatic content recognition (ACR) refers to the ability to identify a content element within the proximity of a probe or sensor, audio, video or image, based on sampling a portion of the audio, or video, or image, processing the sample and comparing it with a reference.

An automatic content recognition system may include a receiver connected to one or more communication channels configured or programmed to receive a remote content signature and a remote device identification over a communication channel and a database. The database may include reference signatures corresponding to content available to be consumed. A query engine may be connected to the database configured or programmed to compare a signature generated from content of interest (stored in the database) to a content signature generated from content the probe is exposed to. The apparatus may include a processor responsive to the query engine configured or programmed to report a remote device identification associated with one of the audio signatures when an audio signature received over the communication channel matches an audio signature stored in the database within a threshold confidence level. The processor may be configured or programmed to report a remote device identification associated with an audio signature received over the communication channel and a content identification of matching content stored in the database when the audio signatures match within a threshold confidence level.

An apparatus for generating an audio signature may include a processor, a microphone connected to the processor and a transmitter connected to the processor capable of transmitting an audio signature to a communications channel. Similarly, an apparatus for generating a video signature may include a processor, a camera or other device to capture image information, for example, a framebuffer, connected to the processor and a transmitter connected to the processor capable of transmitting a video signature to a communications channel.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
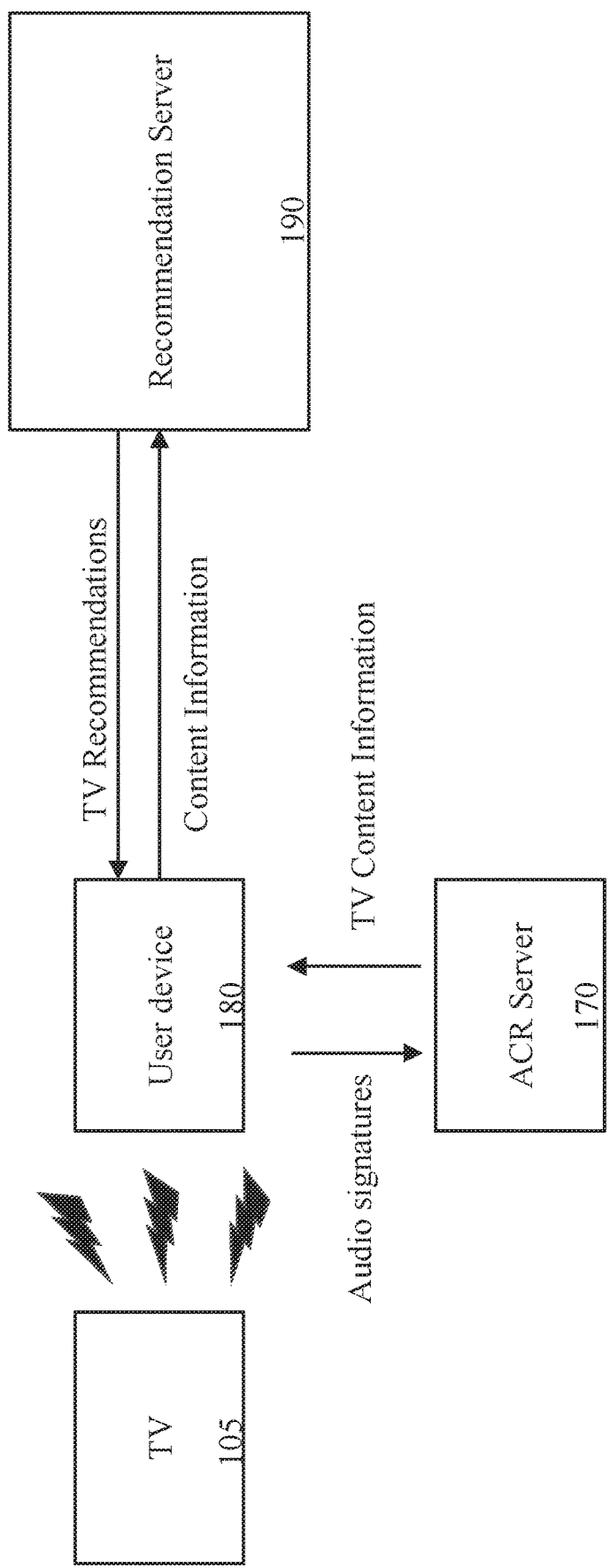
FIG. 1 schematically shows a system for TV recommendations.

Before the present invention is described in further detail, the invention is not limited to the particular embodiments described herein, and may, of course, vary. The terminology used herein is for the purpose of describing particular embodiments only and is not intended to be limiting since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that, as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

The system may rely on collaborative filtering. Collaborative filtering may be used to generate recommendations of content for a user. Recommendations may be generated by comparing the user's rating of previous content to the ratings of other users who have consumed similar content. Users with similar preferences may be identified with either memory-based or model-based methods. There are many ways to implement collaborative filtering.

According to an advantageous feature, the system need not rely on machine analysis of content and therefore it is capable of accurately recommending complex content such as movies without requiring an "understanding" of the content itself. For instance, content-based filtering techniques require content to be assigned attributes to characterize user preferences. Content-based filtering may not be advantageous when the size of content is large. Collaborative filtering assumes that people who agreed in the past will agree in the future, and that they will like similar kinds of items as they liked in the past.

The system may generate a user profile based on user preferences and/or behavior. Metadata associated with users may also be used to generate user profiles. A user profile may include information indicative of the content preferences of the user.

A key advantage of the collaborative filtering disclosed herein is that the system does not need to understand the content, and therefore the system does not need to assign characteristics to content.

The system may rely on implicit ratings in order to determine user preferences. Implicit ratings may be determined by collecting the content that a user consumed. Consumption of content may be represented as implicit user ratings in any number of ways. For instance, a binary method may be used in which a "1" is assigned to content that a user consumes, and a "0" to content that a user does not consume. The rating system may accord weight to factors such as the length of time the user consumed the content, the frequency in which the user consumes that content, and other measures that indicate user preference. The system may also rely on metadata associated with the user.

According to an advantageous feature, users do not need to input valued attributes. User content information, in addition to metadata, provide implicit ratings by assuming that users value content that they consume. The system determines user preferences based on the implicit ratings, and requires no further input from the user.

The system may rely on automatic content recognition technology. As discussed above, automatic content recognition is particularly advantageous to recommender systems when content exposure is monitored and presumed to be correlated to consumption.

Automatic content recognition technology may be used in order to collect user content information. One example of the use of automatic content recognition technology is the identification of audio. Automatic content recognition technology can be used to identify cable or network broadcast content (programs).

The programs may include portions which are the episodes, referred to as principle content, and supplemental content such as commercials, emergency alerts and/or news interruptions. The content maybe audio and visual, visual only, or audio only. The embodiments of the system are described in terms of using audio as a representation of audio visual content, but the invention is equally applicable to audio only content or visual only content. Furthermore, the embodiments of the invention are described in the context of sampling audio and generating audio signatures or fingerprints, but is equally applicable to sampling visual content, including video or images, and generating signatures or fingerprints based on the visual samples.

According to an advantageous feature, automatic content recognition may be utilized to compare audio sampled by one remote user device to audio sampled by another remote user device.

FIG. 1 schematically shows a system for TV recommendations. FIG. 1 shows a remote user device 180 which may be associated with one or multiple individuals. The remote user device 180 may be a device used to collect or process audio information. The information may include audio information and other information that is metadata related to the collected audio or associated with the remote user device or user. The remote user device 180 may be a mobile or stationary device and may be a smart phone, tablet or other device.

Figure 2:
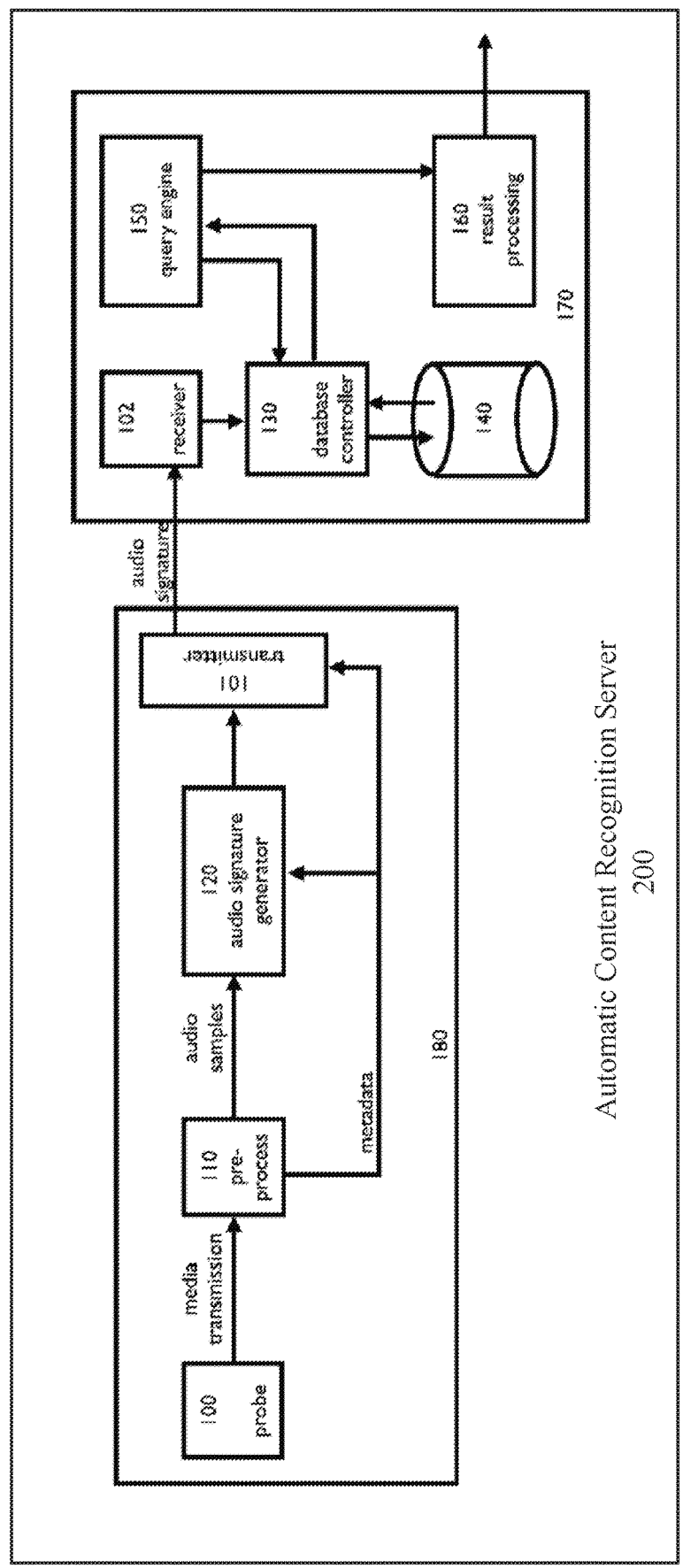
FIG. 2 shows a schematic of a system for automatic content recognition.

FIG. 2 shows a schematic of a system for automatic content recognition ("ACR") subsystem. FIG. 2 shows a remote user device 180 (also depicted in FIG. 1) and an ACR server 170 (also depicted in FIG. 1). The exposure information may be provided to a recognition device such as ACR server 170, which generates content identification corresponding to exposure. The content identification may be provided to a recommending server 190, described hereinafter. Automatic content recognition can be used in many applications where it is desirable to identify audio information.

The system shown in FIG. 2 includes a remote user device 180 having a probe 100 which may be used to collect information for use in automatic content recognition. The information may include audio or visual information and other information that is metadata related to the collected audio or associated with the remote user device or user. The probe may comprise more than one component depending on what components would be useful to collect the information. The probe 100 may include a microphone, clock or time stamp generator, camera, GPS sensor or other elements for location services or temperature sensor and may have access to other device information such as user identification, serial number and MAC address, and time.

The probe 100 may be embodied in a smartphone or tablet which may be associated with a user. The probe 100 may utilize an internal clock or a network accessible clock to generate a time stamp. Smartphone devices provide ready access to location services and other parameters which are known or derived by the probe device or accessed over a communications channel. Apple Support Note HT5594, the content of which is incorporated herein, accessible at "http:" followed by "//support.apple/" followed by ".com/" followed by "kbHT5594" describes location services available to an iOS device.

The information may be processed in order to format and segregate the information. Formatted data representative of an audio or video presentation may be processed by pre-processor 110. The pre-processor advantageously is running on the same device as the probe and may be in the form of an app on a smartphone or tablet or distributed in the form of a library that can be embedded in other apps. The pre-processor may be a component of an app running on a user's smartphone or tablet. For example, the pre-processor may control audio sampling to collect digital information representative of audio.

FIG. 1 shows one possible set-up for identifying user exposure to content. The remote user device 180 may capture audio information using a component to "listen" to audio or "see" visual content being played or present in the location of the remote user device 180. The source of the captured content may be a television 105. The source of the captured content may be a television 105. Capturing may be accomplished by audio or image sampling. The audio samples may be transmitted to an ACR server 170 as captured, or an audio signature may be generated which may then be transmitted to a server location. According to one possible configuration, the audio signature may be an audio fingerprint and may include metadata.

The remote user device 180 may be a cellphone or a tablet device. Smartphones such as an iPhone or Android-based device may serve as the remote user device.

An ACR server 170 may operate to correlate the exposure information received from one or more remote user devices 180 and reference information stored in a database to identify or characterize the exposure information. The reference may include audio signatures or audio fingerprints and metadata for one or more streams of audio and/or visual programming, and may include identification of content and content class, such as principle content or supplemental content.

This information may be useful for many purposes including, without limitation, to feed supplemental media to a user or user device, to price audio content delivery, for analytic or other purposes.

The pre-processor 110 may pass formatted audio samples to an audio signature generation unit 120. There are several ways to generate an audio signature. For example, U.S. Pat. No. 8,468,357 entitled, "Multiple Step Identification of Recordings" is expressly incorporated herein by reference, discloses a method and system where algorithmically-determined fingerprints are extracted from audio information utilizing one or more fingerprint extraction methods. An audio fingerprint may be used as an audio signature. The fingerprint may be less unique than an uncompressed signature but has the benefit of conserving transmission bandwidth and computational resources used for comparison to a reference dataset.

"A system and method for monitoring and recognizing audio broadcasts," is described in U.S. Pat. No. 8,453,170 B2, the disclosure of which is expressly incorporated by reference herein.

The audio signature generator 120 may be advantageously executed on the same device as the probe 100 and the pre-processor 110. Advantageously that device is a user's cellphone, smartphone, or tablet. The audio signature created by audio signature generator 120 and the metadata segregated by pre-processor 110, if any, may be combined and transmitted by transmitter 101 to an ACR server 170. A time stamp may be associated with the audio signature by the remote user device 180. Alternatively, a times stamp may be associated with an audio signature by the ACR server 170 upon receipt of the signature.

The ACR server 170 may include a receiver 102 to receive an audio signature and a database controller 130. The receiver 102 receives audio signatures and any metadata associated with the audio signatures that is transmitted by a remote user device 180. The receiver 102 may associate a time stamp with an audio signature. The database controller 130 may inform a query engine 150 of the signature or the signature received from a user device 180 ("query audio signature") and metadata. The query engine 150 can advantageously access the database 140 in order to find reference signature(s) corresponding to the query audio signature from a remote user device 180 which resulted in the signature. When an audio signature is matched, some or all the metadata and or audio signature may be passed to a result processing module 160 which is able to make use of the identification of the content and metadata.

EP 2501145 A2 is expressly incorporated by reference herein and shows that the identification of the content may be utilized to serve supplemental content to a user. The result processing system 160 may, for example, be a content augmentation service.

The remote user device 180, as previously discussed, may be utilized to monitor audio information at a user location. A device 180 may also be provided to monitor reference content and generate reference audio fingerprints and audio signatures with metadata which may be passed to the database controller 130 and stored in database 140 as a reference. The metadata may be a time stamp, an indication of the identification of the reference content or an indication of the device that captures the content. If the audio signature derived at a user device 180 matches a reference audio signature stored in the database, with an acceptable level of confidence, then the server 170 may use the metadata associated with the reference audio signature and/or associated with the captured device audio signature or derive the identification of the media content monitored by the remote user device 180.

Figure 3:
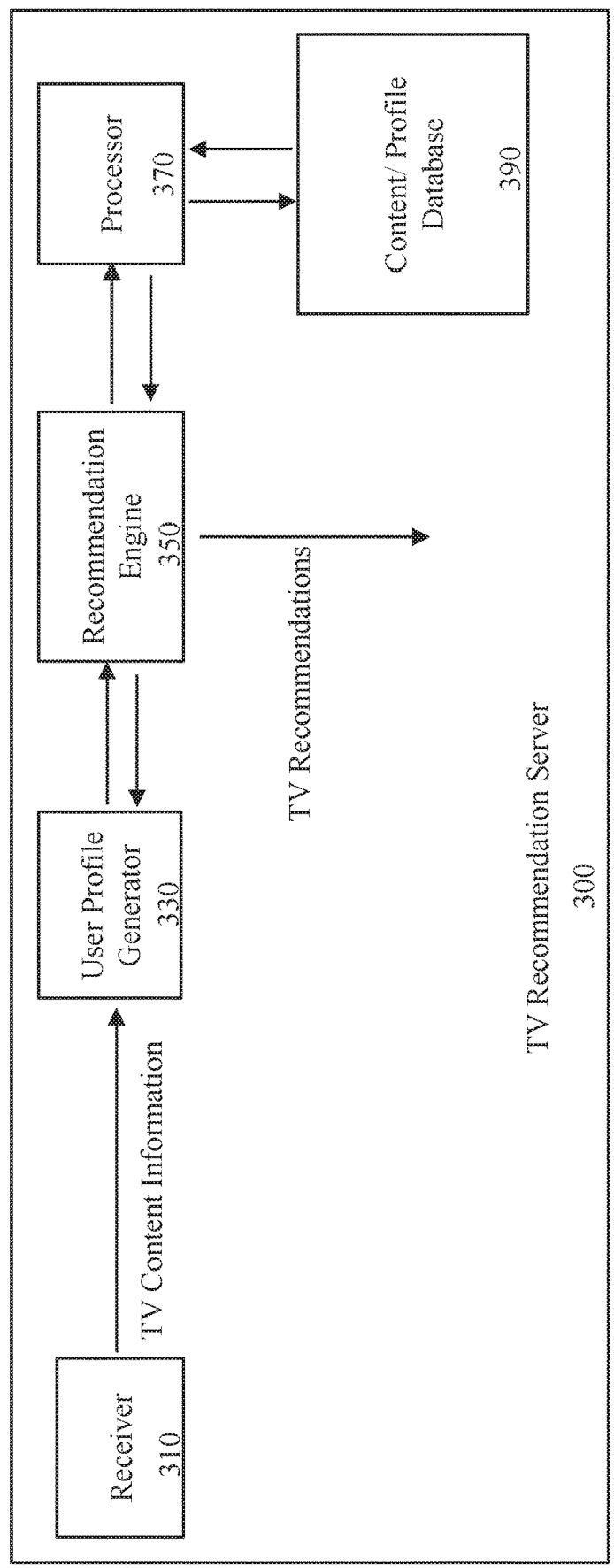
FIG. 3 shows an embodiment of a system for determining content recommendations.

FIG. 3 shows an embodiment of a system for determining TV recommendations. The TV recommendation server 300 may be executed on the same or different devices as the ACR server 170 and the user device 180. The system may include a receiver 310 to receive user consumption information. The receiver 310 also receives any metadata, such as user information, time stamps, and location information. The TV content information may include content identified by the ACR server 170, in addition to metrics such as the length of time the content was consumed and the frequency the user consumed the content. The receiver may also receive interpreted human-machine interactions, such as metrics that measure a user's interest in particular content.

The user profile generator 330 may be utilized to convert user content information into a user profile that advantageously indicates user preferences. It will be evident to one skilled in that art that in another embodiment, the user profile generator may be embedded in the ACR server 170. In this embodiment, the content recognition server would recognize the content, generate a user profile, and the TV recommendation server 300 would receive the user profile.

The user profile generator 330 may use the user content information as implicit user ratings of the content to determine user preferences. The recommendation engine 350 may advantageously format the user profile and any associated metadata for storage in the profile database 390. The recommendation engine 350 may also inform the processor 370 that it has generated a user profile. The processor 370 may be formatted to access the profile database 390 in order to find similar user profiles. The profile database 390 may contain a set of any number of user profiles. The profile database 390 may also contain metadata such as user information, either embedded in the user profiles or stored separately. Similar profiles may then be sent from the profile database 390 to the recommendation engine 350. The recommendation engine 350 may then recommend content found in the similar profiles that is absent from the user profile. In another embodiment, the profile database 390 may contain user content information. According to this embodiment, the processor 370 may be formatted to access the profile database 390 in order to find similar user content to the recommendation engine 350. The recommendation engine 350 may then request that the profile generator 330 create user profiles for users with similar content or create one user profile based on the aggregated data of all similar users. The recommendation engine 350 may then compare the user profile to the similar users' profiles in order to determine user recommendations.

Figure 4:
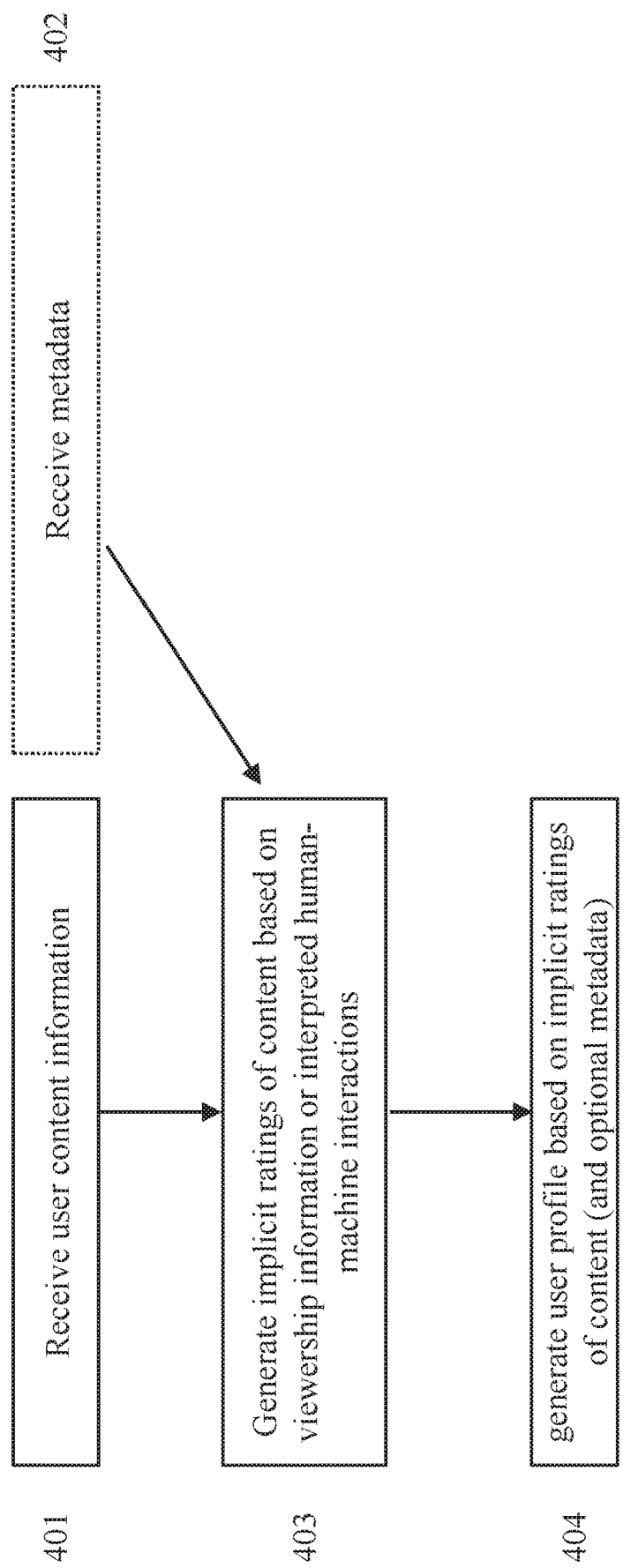
FIG. 4 shows a process flow diagram of an embodiment for generating user profiles.

FIG. 4 shows a method that may be used to generate user profiles. The profile generator 330 received user content information and optionally additional metadata in 401 and 402. This user content data and metadata is then converted into implicit ratings of content. As discussed above, any number of methods may be employed to represent user content information as implicit ratings at 403. A binary method may be used in which a "1" is assigned to content that a user consumes, and a "0" to content that a user does not consume. The rating system may accord weight to factors such as the length of time the user consumed the content, the frequency in which the user consumes that content, and other measures that indicate user preference. The system may also rely on metadata and interpreted human-machine interactions associated with the user in order to build the user profile. For instance, the ACR server 170 may be able determine whether the user consumes certain content by itself, or consumes it along with other content, which may indicate less interest in the content by the user. In this embodiment, the profile generator 330 would accord higher implicit ratings to content that the user chooses to consume by itself. The implicit user ratings of content are then used to generate the user profile in 404.

Figure 5:
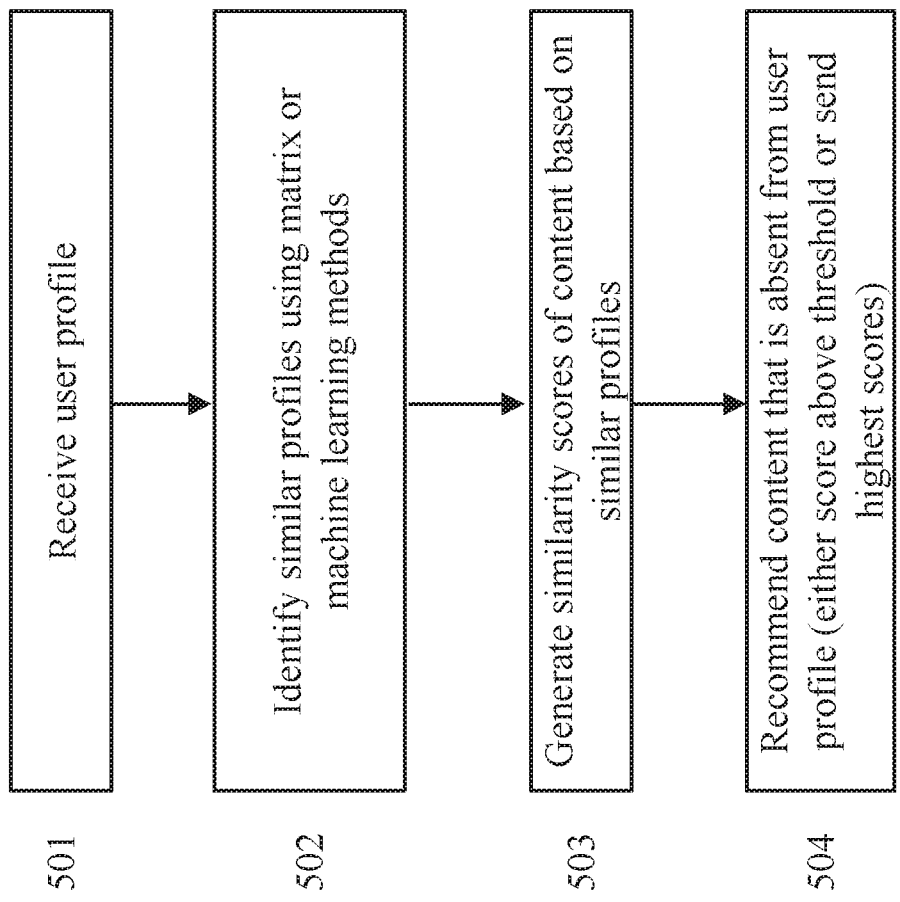
FIG. 5 shows a process flow diagram of an embodiment for determining content recommendations.

FIG. 5 shows a process flow diagram of an embodiment for determining TV recommendations. The recommendation engine 350 receives the user profile from the profile generator 330 in 510.

In 502, the recommendation engine 350 may then query the processor 370 to access the profile database 390 to find similar user profiles. The processor 370 may use any number of efficient methods for filtering data sets, including memory-based and model-based methods. Regardless of search method, it will be evident to one skilled in the art that the various embodiments may be practiced without these specific details. The recommendation engine 350 then assigns recommendation scores to content found in the similar users' profiles in 503. Recommendation scores may depend on how user profiles organize user content. For example, in a user profile that uses the binary method of implicit user ratings by adding consumed content to the user's profile and rejecting content that was not consumed by the user, the recommendation engine 350 may assign recommendation scores by counting the prevalence of content in the similar users' profiles. A user profile that uses more sophisticated metrics to define implicit user ratings may define recommendation scores based on any desired weighting of metrics. In 504, the recommendation engine 350 identifies content based on recommendation scores and an absence (or otherwise determined to be of interest to the user) from the user profile. What content is ultimately sent to the user as a recommendation depends on the specific implementation of the system. For instance, in one embodiment, the recommendation engine 350 may recommend all content with recommendation scores above a certain threshold that is absent from the user profile. The recommendation engine could also have a pre-determined number of recommendations and could select the content with the highest recommendation scores that are absent from the user profile until the quota is filled. Recommendations may be sent back to the user device 180 or to another device, depending on the implementation of the system. For instance, when a user's user device 180 is associated with a TV 105, smartphone, tablet, or other user device, recommendations may be sent to any device of interest.

Figure 6:
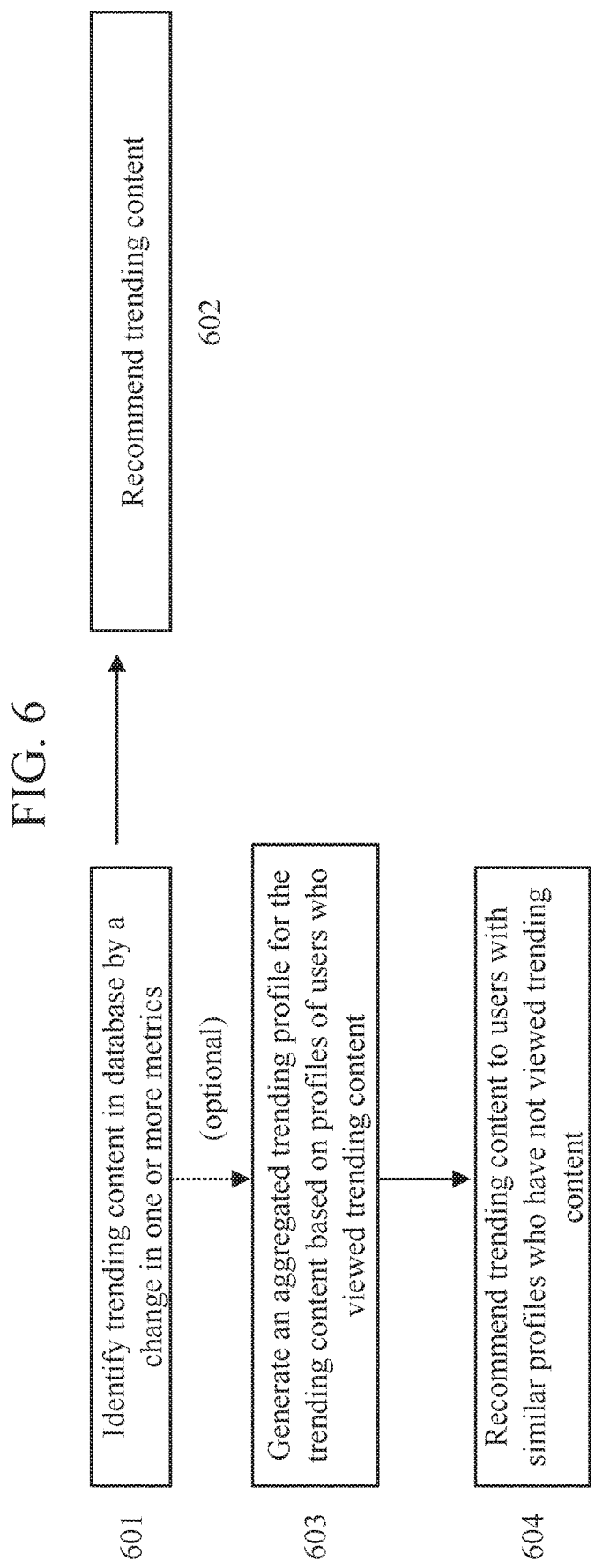
FIG. 6 schematically shows a flow diagrams of an embodiment for recommending trending content.

FIG. 6 schematically shows a flow diagram of an embodiment for recommending trending content. The profile database 390 identifies trending content by a change in one or more metrics measuring aggregated data in 601. For example, the profile database may identify trending content when viewership of particular content increases by a determined amount over a specified time period. The aggregated data may be the entire population of user profiles or may be a subset of the entire population. Subsets may be identified by the user profile, or by metadata or users of particular content. For example, the profile database 390 may identify trending content for users in a certain geographic region. In one embodiment, content that is identified as trending may be sent as recommendations in 602. In another embodiment, the recommendation engine 350 may then query the processor 370 may to access the profile database 390 for the user profiles of users that consumed the trending content ("trending users"). The processor 370 may be formatted to aggregate the user profiles of all or some of the trending users into a trending profile in 603. The TV recommendation server 300 may then perform steps 501 and 502 in order to identify similar user profiles. The recommendation engine 350 may then recommend the trending content to users of the identified similar user profiles who have not consumed the trending content.

Figure 7:
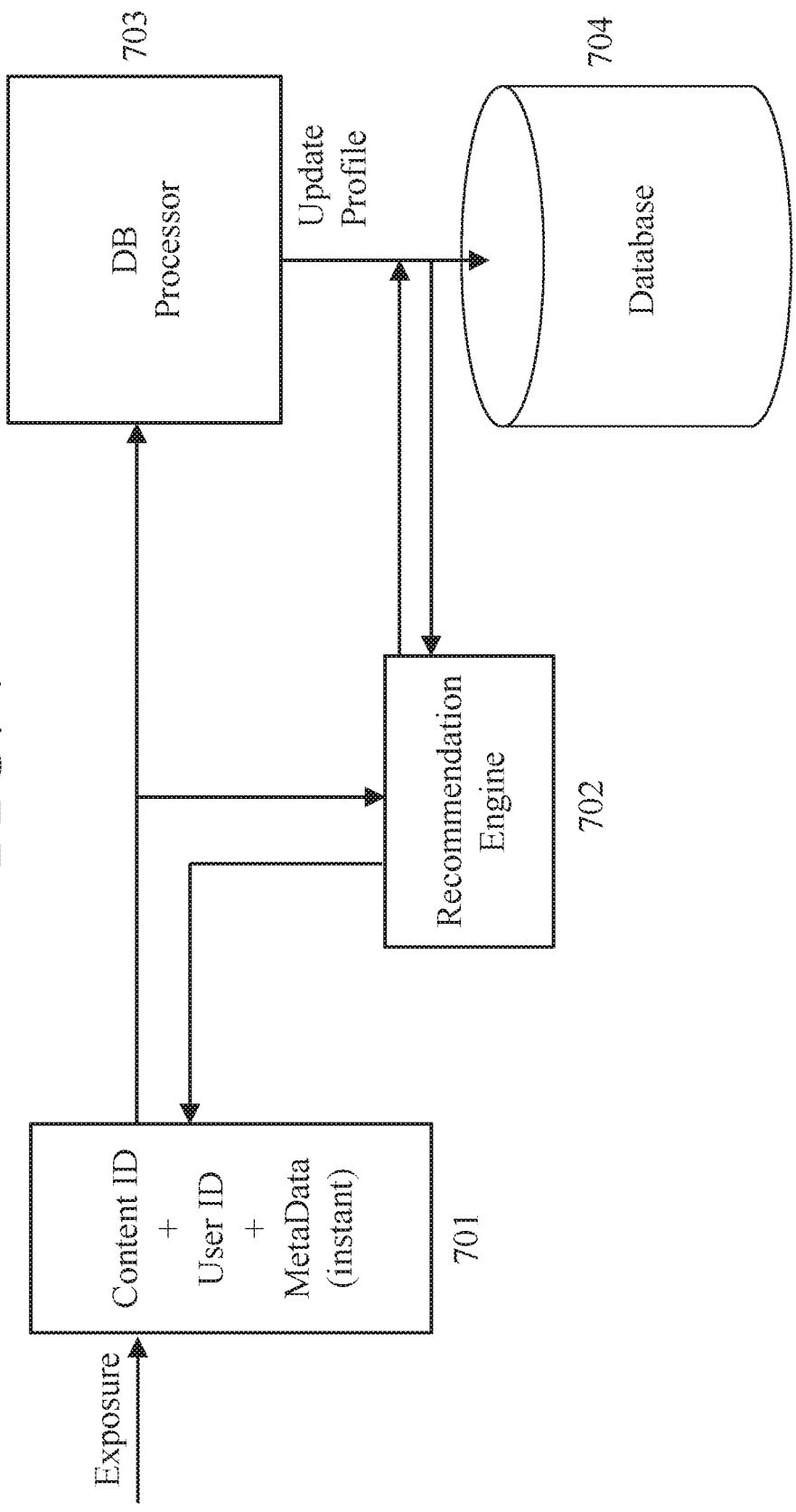
FIG. 7 shows an embodiment of a recommendation system.

FIG. 7 shows an embodiment of a recommendation system. A receiver 701 is provided to receive exposure data. The exposure data may include an indication of the content that a user data collection device is exposed to, a user collection device identification, and metadata concerning the user exposure. The metadata may be information concerning the exposure such as time, duration, noise, etc. The metadata may also include user collection device information such as IP address, MAC address, location data, device type, etc. The exposure data may be data received in real-time or near real-time, or the data may be delayed. Real-time or near real-time exposure data may be obtained from an ACR system or a media player reporting device. The reporting device may be part of the media player, such as a television; or may be a set-top box, such as a cable or satellite box; or other player, such as Roku, AppleTV, etc. Near real-time reporting may also be obtained from a streaming service such as Netflix or Amazon Prime. Exposure data may be obtained from a data intelligence provider or other audience data consolidator which may not be contemporaneous with viewing, and may be received in bulk or in a stream.

A database processor 703 may operate to take the exposure data received at receiver 701 and use the exposure data to create and/or update the user profile stored in database 704. According to an embodiment, shown in FIG. 7, a recommendation system may serve many users. The user media players may be communicatively coupled to the recommendation system. A recommendation engine 702 accesses the profiles in database 704. The profile information stored in database 704 may be utilized to generate a recommendation for a particular user. There are various modes of delivering recommendations. For one example, receipt of exposure data from a particular user may be utilized to trigger the recommendation engine 702 to evaluate that user's stored profile and/or the user's exposure data to analyze the user profiles of similar users in order to generate a recommendation to the triggering user. If a threshold of similar users has been exposed to content which the triggering user has not yet been exposed to, the recommendation engine 702 can provide a recommendation of that program to the triggering user. In some situations, the calculation to generate a recommendation may be done in real-time or alternatively, the recommendations may be generated in advance and one or more recommendations may be queued for delivery to a user.

As will be appreciated, the computational requirements for generating recommendations increase as the number of profiles, the amount of data in the profiles, and the number of users who are eligible to receive recommendations. In some situations, it may be advantageous to use data clustering to reduce the computational capacity necessary to achieve recommendations. The system may be structured to provide for a plurality of profile categories. The number of profile categories may be many fewer than the number of profiles. Each profile may be evaluated and placed into a category. Then, when a recommendation is established, it may be established for [a] user whose profile falls within a category by reference to a category profile or a category-based recommendation set rather than a recommendation based on a consensus based on profile similarity across the entire population determined each time a recommendation is needed.

Figure 8:
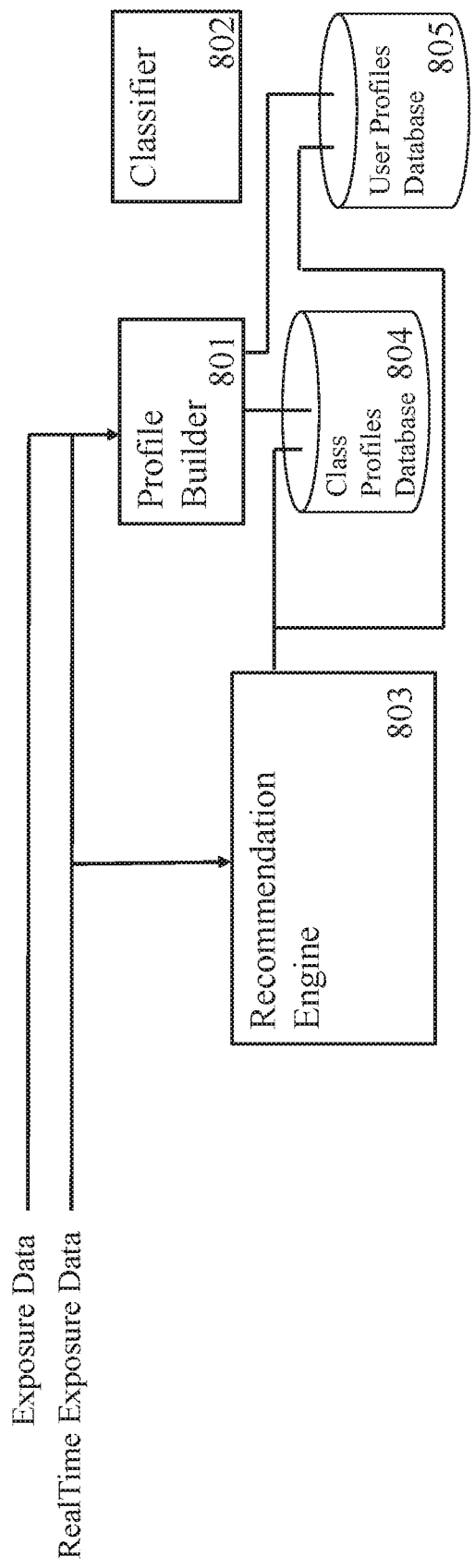
FIG. 8 shows a recommendation system which relies on classification-based recommendations.

FIG. 8 shows a recommendation system which relies on classification-based recommendations. The recommendation system of FIG. 8 receives exposure data which may include real-time or near real-time exposure data and other exposure data. All exposure data may be provided to a profile builder 801. The profile builder 801 may establish, maintain, and/or update a user profile database 805. The system may include a classifier 802 connected to the profile builder 801. The classifier 802 assesses user profiles to identify a profile as being within a particular class. The classes may be pre-established and the operation of the classifier is to assess a user profile and determine which of the pre-established classes the profile more closely resembles. Alternatively, the classifier 802 may operate in a way that determines a statistically significant correlation between multiple user profiles and establishes a class based on the collection of user profiles which corresponds to each statistically significant population. According to one method of operation, the classifier 802 may also include a predetermined set of classifications and user profiles which do not fall within one of the statistically significant classifications may be assigned to the closest class of user profiles. It may be advisable to exclude a particular user profile from the closest class in the event that the profile does not meet a threshold for correlation. The reason for this is to avoid dilution of a statistically significant class. While this may increase the probability of an irrelevant recommendation being provided to an excluded user profile, it should increase the probability of a relevant recommendation when averaged out over the full set of user profiles. The class profile database 804 may include class profiles for each pre-established class and/or each class established based on a statistically significant correlation amongst a subset of users. A recommendation engine 803 may be configured to generate a set of recommendations for each user and/or a set of recommendations for each user class. The recommendation engine 803 may generate recommendations on command and/or generate a reserve of one or more recommendations available upon request. Advantageously, a recommendation provided to a user may rely on a combination of the class profile that the user falls into and the user's individual profile. Such a configuration would allow the recommendation engine 803 to customize recommendations for each individual user rather than provide class-based recommendations to users. If the recommendation system provided class only-based recommendations, it may be possible that a user may receive recommendations for content that the user has already seen or recommendations for content previously recommended but rejected by a user.

Figure 9:
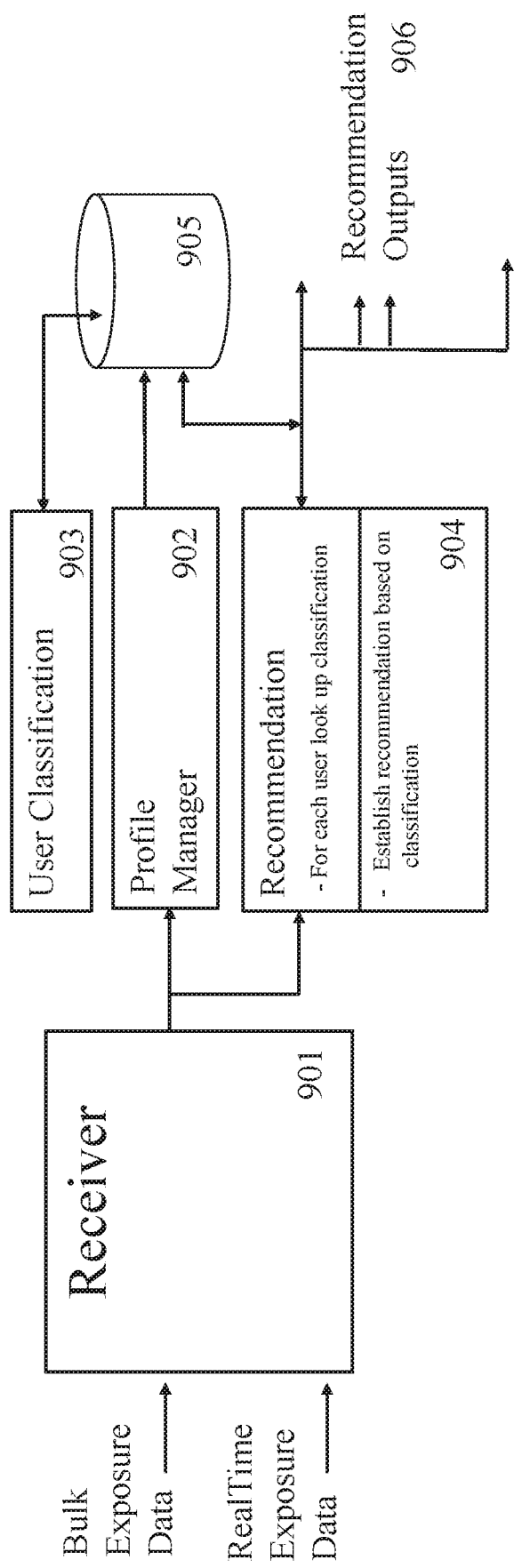
FIG. 9 shows another embodiment of a recommendation system.

FIG. 9 shows another embodiment of a recommendation system. The embodiment of FIG. 9 may be implemented in one or more servers. A receiver 901 receives exposure data. The exposure data may include bulk exposure data and real-time or near-real time exposure data. While the real-time exposure data utilized in the embodiment according to FIG. 8 is for the purpose of enhancing the accuracy or relevance of recommendations for users that the recommendation system identifies as users being exposed to content in real-time. The real-time exposure data of FIG. 9 may be utilized to establish recommendations based on trending information. A profile manager 902 receives exposure data and operates to establish, maintain, and update user profiles. An embodiment of FIG. 9 may also be provided with a classifier 903. The classifier 903 operates in the same manner as classifier 802, except in the embodiment of FIG. 9, the classifier 903 operates independently of the profile manager 902. A recommendation engine 904 may be provided which may include the functionality described in connection with recommendation engine 803. In addition, the recommendation engine 904 operates to evaluate real-time exposure data by user class in order to establish trending recommendations. The trending recommendations may be established on demand for individual users or for a class of users. In addition, or alternatively, the trending recommendations may be established and held in reserve in order to increase responsiveness of the delivery of recommendations to a user. In the event that trending recommendations are established in advance, it is advantageous to include an expiration of such recommendations in order to avoid delivery of "trending" recommendation which are no longer trending. The recommendation engine 904 may include a plurality of recommendation outputs 906. Additional constraints may be added to the recommendation engine. For example, the recommendation count for a specific recommendation may be capped. Another example is to constrain recommendations by day-part or device type.

Many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "contains" and "containing" should be interpreted as referring to members, or components in a non-exclusive manner, indicating that the referenced elements and components, may be present, or utilized, or combined with other members and components that are not expressly referenced.

The invention is described in detail with respect to preferred embodiments. It will be apparent to those skilled in the art that certain changes and modifications may be made without departing from the invention in its broader aspects, and the invention, therefore, as defined in the claims, is intended to cover all such changes and modifications that fall within the true spirit of the invention.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method for recommending trending content comprising the steps of:
   identifying trending content in a profile database by a change in one or more metrics of aggregated data in said profile database;
   generating a trending profile based on aggregated profiles of trending users, wherein the processor identifies trending users as users who have consumed said trending content and wherein said processor retrieves user profiles of trending users from said profile database;
   retrieving by a processor from said profile database user profiles similar to said trending profile and delivering said user profiles similar to said trending profile to the recommendation engine, wherein the processor uses collaborative filtering to only deliver user profiles that are both similar to the trending profile and do not indicate consumption of said trending content; and
   recommending the trending content by a recommendation engine to users who have user profiles that are both similar to the trending profile and do not indicate consumption and said trending content.

2. The method according to claim 1 further comprising the step of:
   generating the trending profile by additionally using aggregated user information and other metadata of the trending users.

3. The method according to claim 1 further comprising the step of:
   determining trending content within a subset of user profiles in the profile database by the processor, wherein the subset is determined by user information and other metadata indicating geographic location of the user.

4. The method according to claim 1 further comprising the step of:
   filtering a subset of the users to be recommended trending content by the recommendation engine, wherein the subset is determined by user information and other metadata indicating time period of a day when the user consumes content.

\* \* \* \* \*